United States Patent [19]

Aoki

[11] Patent Number: 5,078,019
[45] Date of Patent: Jan. 7, 1992

[54] TRACKBALL DEVICE

[75] Inventor: Tsuyoshi Aoki, Wakuya, Japan

[73] Assignee: Alps Electric Co., Ltd., Tokyo, Japan

[21] Appl. No.: 514,391

[22] Filed: Apr. 25, 1990

[30] Foreign Application Priority Data

May 26, 1989 [JP] Japan .................................. 1-60369[U]

[51] Int. Cl.$^5$ .................................................. G09G 1/00
[52] U.S. Cl. ................................ 74/471 XY; 340/710; 16/26
[58] Field of Search ............... 74/471 XY; 273/148 B; 340/710; 384/610; 16/25, 26

[56] References Cited

U.S. PATENT DOCUMENTS

| | | | |
|---|---|---|---|
| 1,265,850 | 5/1918 | Wierszewska | 16/26 |
| 1,356,566 | 10/1920 | Smith | 16/26 |
| 3,987,685 | 10/1976 | Opocensky | 273/148 B |
| 4,404,865 | 9/1983 | Kim | 74/471 XY |
| 4,538,476 | 9/1985 | Luque | 74/471 XY |
| 4,562,347 | 12/1985 | Hovey et al. | 74/471 XY |
| 4,575,086 | 3/1986 | Kim et al. | 74/471 XY |
| 4,594,586 | 6/1986 | Hosogoe | 74/471 XY |
| 4,920,341 | 4/1990 | Aoki et al. | 341/15 |
| 4,952,919 | 8/1990 | Nippoldi | 273/148 B |
| 4,996,738 | 3/1991 | Tifre | 16/26 |

FOREIGN PATENT DOCUMENTS 3407131 8/1985 Fed. Rep. of Germany ...... 340/710

Primary Examiner—Gary L. Smith
Assistant Examiner—Darnell M. Boucher
Attorney, Agent, or Firm—Guy W. Shoup; Paul J. Winters

[57] ABSTRACT

A trackball device comprising a housing having a circular opening formed in a top wall thereof, a ball received in the housing and partially projecting through the circular opening, a pair of rotatable members arranged orthogonally to each other and rotatable in accordance with rotation of the ball, detectors capable of detecting the amounts of rotation of the respective rotatable members, and elastic members arranged in the vicinity of the edge of the circular opening and capable of suppressing vibration of the ball.

11 Claims, 1 Drawing Sheet

TRACKBALL DEVICE

BACKGROUND OF THE INVENTION

1. Field of the Invention

The present invention relates to a trackball device which is used, for example, as a device for moving a cursor on a display screen.

2. Description of the Related Art

Trackball devices have been proposed as X-Y coordinate input means for moving a cursor or the like on a display screen to a desired coordinate point, on the screen, or to select a desired menu item appearing on the display. Some trackball devices respond to manual rotation of a ball partly projecting from an upper wall of a casing.

FIG. 3 is a schematic perspective view of a major portion of a known trackball device. As will be seen from this Figure, this known trackball device has a housing 32 serving as an outer shell and provided with a circular opening formed in a top wall thereof, a ball received in the housing 32 and partially projecting through the circular opening 31, a pair of rotatable members 34, 35 which are arranged orthogonally to each other and which are rotatable in accordance with the rotation of the ball 33, and detectors 36, 37 such as encoders capable of detecting the amounts of rotation of the rotatable members 34, 35. The rotatable member 34 includes a roller 38 contacting a lower portion of the ball 33 and a rotary shaft 39 rotatable as a unit with the roller 38. The other rotatable member 35 has a similar construction.

In operation, the user rotates by hand the ball 33 projecting through the circular opening 31 in the casing 32. The X-axis component and the Y-axis component of the rotation are transmitted to the orthogonal rotatable members 34, 35. The amounts of rotation of these rotatable members 34 and 35 are respectively detected by detectors 36, 37 which produce detection signals in accordance with which a cursor is moved on a display screen (not shown) of a display device to which the trackball device is connected. When the cursor has been moved to a desired coordinate position or to a position of a desired menu item, the user stops the rotation of the ball 33 and turns an input switch (not shown) on thereby inputting the coordinate value or selecting the menu item.

Trackball devices of the kind described are finding spreading use and have been used as a component of a display device which is mounted on vehicles such as automobiles. The known trackball devices, when used on vehicles, encounter the following problems due to vibration of the vehicle. Namely, the ball vibrates up and down so as to collide with the edge 31a of the circular opening 31 in the housing 32 so as to generate chattering noise which annoys persons on board. In addition, the edge 31a tends to be damaged.

SUMMARY OF THE INVENTION

Accordingly, an object of the present invention is to provide a trackball device which is improved to suppress noise generation and damaging of the edge of opening in the housing attributable to vibration of ball, thereby overcoming the above-described problems of the prior art.

To this end, according to the present invention, there is provided a trackball device comprising: a housing having a circular opening formed in a top wall thereof; a ball received in the housing and partially projecting through the circular opening; a pair of rotatable members arranged orthogonally to each other and rotatable in accordance with rotation of the ball; detectors capable of detecting the amounts of rotation of the respective rotatable members; and elastic means arranged in the vicinity of the edge of the circular opening and capable of suppressing vibration of the ball.

In the trackball device of the present invention, vibration of the ball is prevented by the elastic means arranged in the vicinity of the circular opening in the housing. Therefore, the ball is not substantially vibrated despite any vibration of the housing, so that vibratory collision of the ball with the edge of the opening in the housing is prevented, thus eliminating generation of noise and damaging of the edge of the opening in the housing.

The above and other objects, features and advantages of the present invention will become clear from the following description of the preferred embodiment when the same is read in conjunction with the accompanying drawings.

DESCRIPTION OF THE PREFERRED EMBODIMENT

Figure 1:
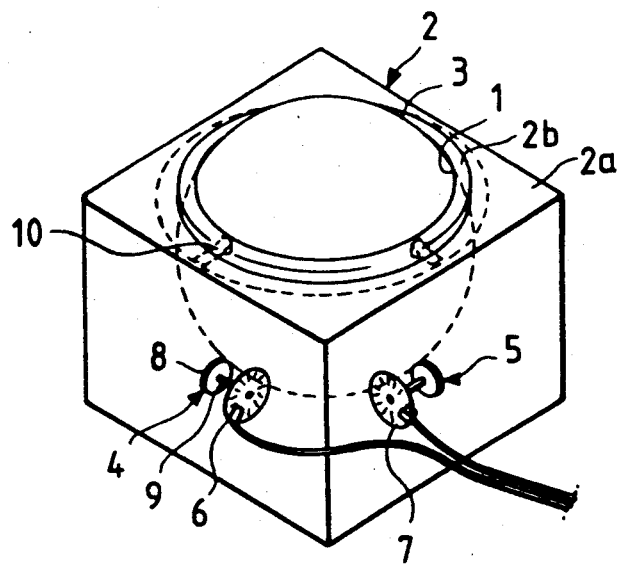
FIG. 1 is a schematic perspective view of a critical portion of an embodiment of the trackball device of the present invention.
Figure 2:
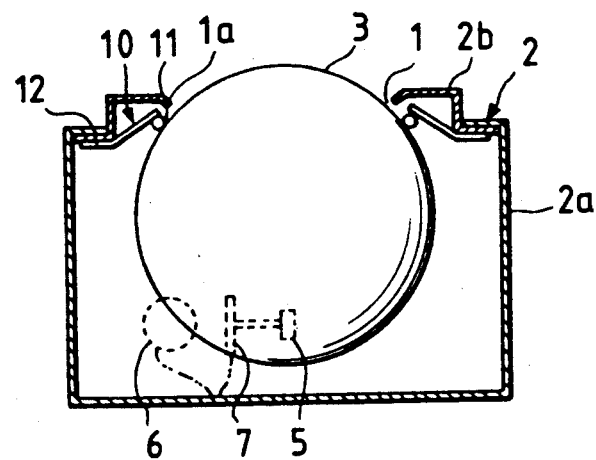
FIG. 2 is a longitudinal sectional view of the trackball device shown in FIG. 1.
Figure 3:
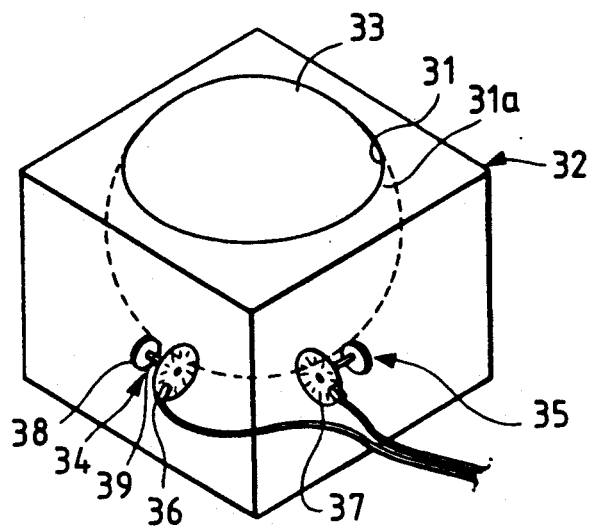
FIG. 3 is a schematic perspective view of a known trackball device.

Referring to FIGS. 1 and 2, a trackball device embodying the present invention is primarily composed of the following parts: a housing 2 which is composed of a main part 2a and a cover 2b which is detachably secured to the upper side of the main part 2a and which is provided with a circular opening 1; a ball 3 received in the housing 2 so as to partially project through the circular opening 1; a pair of rotatable members 4, 5 which are arranged orthogonally to each other and which are capable of rotating in accordance with the rotation of the ball 3; and detectors 6, 7 capable of detecting amounts of rotation of the rotatable members 4, 5. The rotatable member 4 includes a roller 8 contacting a lower portion of the ball 3, and a rotary shaft 9 which is rotatable as a unit with the roller 8. The other rotary member 5 has a similar construction.

Referring in particular to FIG. 2, the trackball device of the present invention has elastic means arranged in the vicinity of the edge 1a of the circular opening 1 formed in the wall of the housing 2 and capable of suppressing vibration of the ball. In the illustrated embodiment, the elastic means includes four elastic members 10 arranged in two orthogonal pairs each having a pair of diametrically opposing elastic members 10. Each elastic member 10 includes a contact portion arranged in the vicinity of the edge 1a and contacting an upper portion of the ball 3, e.g., a small ball 11, and a resilient spring member, e.g., a leaf spring 12, which carries the small ball 11 at one end and which is supported at its other end on the cover 2b.

In operation, as in the case of the known trackball device, the user manually rotates ball 3 which partially projects through the circular opening 1 in the housing 2.

The X-axis component and the Y-axis component of rotation of ball 3 are transmitted to orthogonal rotatable members 4, 5, and the amounts of rotation of these rotatable members 4, 5 are detected by detectors 6, 7. Detectors 6, 7 then produce respective detection signals in accordance with which the cursor is moved on the display screen of the display device connected to the trackball device. Leaf spring 12 applies a resilient force having a level which would not cause any excessive contact pressure between the small ball 11 and the ball 3. In addition, the small ball 11 makes a point contact with the ball 3 so that it does not cause substantial frictional resistance. Thus, the elastic means composed of four elastic members 10 does not cause any noticeable increase in the force required for rotating the ball 3.

Leaf springs 12 of the elastic means impart downward resilient force on ball 3 through the small balls 11 which contact with upper portions of the ball 3. Therefore, vibration of ball 3 is effectively suppressed by the elastic means so that the vibration of ball 3 is substantially prevented. In consequence, vibratory collision of ball 3 with the edge 1a is avoided thereby preventing generation of noise and damaging of the edge 1a.

In the described embodiment, each elastic member 10 is secured at one of its ends to the cover 2b independently of the main part 2a of the housing, and thus the efficiency in the assembly work is improved advantageously.

The described embodiment employs small balls 11 as contact portions which are arranged in the vicinity of the edge 1a and which contact with upper portions of ball 3. The small balls 11, however, may be substituted by other suitable members which can minimize the area of contact with the ball 3, e.g., rollers, pins, compact bearings and so forth. Leaf springs 12 for resiliently supporting the contact portions on the cover 2b are also illustrative and may be substituted by other suitable elastic or resilient means such as coiled springs, wire springs or the like.

The elastic means in the described embodiment includes four elastic members 10. This, however, is not exclusive; the elastic means may include one, two, three, or five or more of such elastic members.

As will be understood from the foregoing description, the trackball device of the invention can substantially eliminate vibration of the ball even when the housing is vibrated, so that generation of noise and damaging of the edge of the opening in the housing, which are attributable to collision of the ball with the edge, are effectively prevented, thus adapting to use on vehicles such as automobiles.

Although the invention has been described through specific terms, it is to be understood that the described embodiment is only illustrative and various changes and modifications may be imparted thereto without departing from the scope of the present invention which is limited solely by the appended claims.

What is claimed is:

1. A trackball device comprising:
   a housing having a circular opening formed in a top wall thereof;
   a ball received in said housing and partially projecting through said circular opening;
   a pair of rotatable members arranged orthogonally to each other and rotatable in accordance with rotation of said ball, said rotatable members being in contact with the lower peripheral surface of said ball;
   detectors capable of detecting the amounts of rotation of the respective rotatable members; and
   elastic means arranged in the vicinity of the edge of said circular opening and capable of suppressing vibration of said ball, said elastic means including spring means, each spring means having a projection disposed to make point contact on the upper peripheral surface of said ball thereby urging said ball towards said rotatable members.

2. A trackball device comprising:
   a housing having a main part and a detachable cover which is provided with a circular opening formed therein;
   a ball received in said housing and partially projecting through said circular opening;
   a pair of rotatable members arranged orthogonally to each other and rotatable in accordance with rotation of said ball, said rotatable members being in contact with the lower peripheral surface of said ball;
   detectors capable of detecting the amounts of rotation of the respective rotatable members; and
   elastic means supported by said cover at a position in the vicinity of the edge of said circular opening and capable of suppressing vibration of said ball, said elastic means including spring means, each spring means having a projection disposed to make point contact on the upper peripheral surface of said ball thereby urging said ball towards said rotatable members.

3. A trackball device according to claim 1 wherein said elastic means includes at least one elastic member arranged to make a resilient contact with an upper portion of said ball.

4. A trackball device according to claim 1 wherein said elastic means includes a plurality of elastic members arranged at a predetermined angular interval so as to contact with the peripheral surface of said ball.

5. A trackball device according to claim 2 wherein said elastic means includes at least one leaf spring, one end of said leaf spring secured to said cover and the other end of said leaf spring contacting a small ball.

6. A trackball device according to claim 2 wherein said elastic means includes at least one elastic member arranged to make a resilient contact with an upper portion of said ball.

7. A trackball device according to claim 2 wherein said elastic means includes a plurality of elastic members arranged at a predetermined angular interval so as to contact with the peripheral surface of said ball.

8. A trackball device comprising:
   a housing having a circular opening formed in a top wall thereof;
   a ball received in said housing and partially projecting through said circular opening;
   a pair of rotatable members arranged orthogonally to each other and rotatable in accordance with the rotation of said ball, the weight of said ball being supported by said rotatable members;
   detectors capable of detecting the amounts of rotation of the respective rotatable members; and
   elastic means arranged in the vicinity of the edge of said circular opening and capable of suppressing vibration of said ball, said elastic means including spring means, each spring means having a projection disposed to make point contact on the upper peripheral surface of said ball thereby urging said ball towards said rotatable members.

9. A trackball device comprising:

a housing having a main part and a detachable cover which is provided with a circular opening formed therein;

a ball received in said housing and partially projecting through said circular opening;

a pair of rotatable members arranged orthogonally to each other and rotatable in accordance with the rotation of said ball, the weight of said ball being supported by said rotatable members;

detectors capable of detecting the amounts of rotation of the respective rotatable members; and elastic means supported by said cover at a position in the vicinity of the edge of said circular opening and capable of suppressing vibration of said ball, said elastic means including spring means, each spring means having a projection disposed to make point contact on the upper peripheral surface of said ball thereby urging said ball towards said rotatable members.

10. A trackball device of claim 1 wherein both rotatable members are in contact with the lower peripheral surface of said ball.

11. A trackball device of claim 2 wherein both rotatable members are in contact with the lower peripheral surface of said ball.

* * * * *